May 6, 1969  MASAO WAKATSUKI ET AL  3,442,616

METHOD OF MAKING SYNTHETIC DIAMOND CRYSTALS

Filed Nov. 7, 1966

INVENTORS
Masao Wakatsuki,
Toshio Aoki, Shinichiro Takasu,
and Nobuyuki Wakamatsu
BY
Kenyon, Palmer & Estabrook

United States Patent Office 3,442,616
Patented May 6, 1969

3,442,616
METHOD OF MAKING SYNTHETIC DIAMOND CRYSTALS
Masao Wakatsuki and Toshi Aoki, Yokohama-shi, and Shinichiro Takasu and Nobuyuki Wakamatsu, Tokyo, Japan, assignors to Tokyo Shibaura Electric Co., Ltd., Kawasaki-shi, Japan, a corporation of Japan
Filed Nov. 7, 1966, Ser. No. 592,366
Claims priority, application Japan, Nov. 13, 1965, 40/69,478
Int. Cl. C01b *31/00*
U.S. Cl. 23—209.1          8 Claims

ABSTRACT OF THE DISCLOSURE

Synthetic diamonds are prepared by subjecting carbonaceous material to a pressure of at least 50,000 atm. and a temperature of at least 1,200° C. in the presence of a combination of metals which serves as a catalyst, i.e., at least one of the metals vanadium, tungsten or molybdenum combined with at least one of the metals copper, silver or gold.

---

This invention relates to a method of preparing synthesized diamonds employing novel catalysts other than those already known in the conventional diamond synthesizing method wherein carbonaceous materials are subjected to a reaction pressure of several tens of thousand atmospheres at a temperature of several thousand degrees centigrade in the presence of catalysts.

Diamond, which is used in a great variety of fields of applications both for ornamental and industrial purposes, is so limited in the amount of natural yields because of the few known sources of diamond that it can scarcely meet all the demands at present. Moreover, high quality diamond crystals suitable for these applications amount to a very limited proportion of the total supply of natural diamonds. For this reason, attempts have been made to artificially convert carbonaceous materials to diamond. Studies on thermodynamics have made it evident that graphite, for example, can be converted into diamond crystals with a very high pressure and very high temperatures. In carrying out this diamond synthesis, however, at least a pressure of 130,000 atmospheres and a temperature of 4000° C. are required. A number of problems also reside in the technique of designing and operating the conversion device, and these factors cause the diamond synthesizing process to be impractical. The pressure and temperature practically available are lower than 100,000 atmospheres and 2000° C., respectively. To meet these requirements catalysts which may be used with a relatively low pressure and temperature in the formation of synthesized diamond have heretofore been proposed. For example, U.S. Patents Nos. 2,947,610 and 2,947,611 disclose, as preferred catalysts, twelve elements, that are iron, nickel, cobalt, platinum, palladium, ruthenium, osmium, iridium, rhodium, chromium, manganese and tantalum. Synthesized diamond crystals may be obtained for example by maintaining graphite in contact with nickel under a pressure of 70,000 atmospheres at a temperature of from 1600° C. to 1800° C. for about one minute. The crystals thus obtained by employing nickel, however, are always colored yellowish green and it is considered extremely difficult to grow colorless, transparent crystals of large grain and of a right shape as a natural crystal habit. Furthermore, when the conversion temperature is elevated beyond a certain point, feather-like or dentritic crystals tend to develop. A drop of the temperature below that certain point will result in the formation of only hexahedral crystals of poor transparency, with the result that a very precise temperature control is required to maintain the optimum temperature under a given pressure and the operations involved in such temperature control prove to be very difficult and troublesome under the condtions of elevated temperatures and elevated pressures. Even if the difficulty in the temperature control is overcome, the diameters of grain of the crystals obtained will vary usually over a wide range of from ten-odd microns to 0.3 mm., and it would practically be impossible to constantly obtain diamond crystals of substantially a uniform grain size. These tendencies become more conspicuous when iron, cobalt and the other known catalysts are used in place of nickel.

An object of this invention is to provide a method whereby carbonaceous materials may be converted in the presence of new catalysts to diamonds of pure or substantially colorless and transparent crystals.

Another object of this invention is to provide a method whereby carbonaceous materials may be converted in the presence of new catalysts to diamonds which are excellent in crystal structure, right in a natural crystal habit and uniform and relatively large in grain size.

These and other objects of this invention are accomplished by employing, as novel catalysts, alloys or mixtures of a combination of elements each selected from two groups of elements, i.e. a group consisting of vanadium, tungsten and molybdenum and a group consisting of copper, silver and gold.

The features of the invention which are believed to be novel are set forth with particularity in the appended claims. The invention itself, however, as to its organization together with further objects and advantages thereof, may best be understood by reference to the following description taken in connection with the accompanying drawings, in which:

According to the method of this invention, the preferred alloys or mixtures of the present invention may contain elements other than the elements selected from the above mentioned two groups, one consisting of vanadium, tungsten and molybdenum, and the other consisting of copper, silver and gold. For example, the alloys or mixtures may include alloys or mixtures such as tungsten-copper-aluminum, vanadium-silver-tin, and molybdenum-copper-zinc. The component elements forming the catalysts may either be alloyed or mixed together by any suitable manner. It should be noted that the following twelve elements, viz. iron, nickel, cobalt, platinum, palladium, ruthenium, osmium, iridium, rhodium, chromium, manganese and tantalum are not appropriate to be included as a component of the catalyst, since these metals have catalytic actions per se in diamond synthesis and tend to produce poor quality diamond crystals as described above.

Vanadium, tungsten and molybdenum to be used in this invention may be either in the pure or elemental state or in the form of compounds. For example, carbides of molybdenum, tungsten or vanadium are no less effective than those of high purity in the synthesis of diamond crystals. This also applies to copper, silver and gold. For example, copper suboxide, silver oxide, or sulfides of these elements may be used as effectively as the pure ones. It is believed that these compounds are in the molten phase under high pressures and at high temperatures to be used in the present invention and decompose themselves liberating free pure elements from the compounds thereof.

As carbonaceous materials to be transformed to diamond, almost all the substances containing carbon in various forms may be used. Graphite is the simplest form of carbon and is the most suitable starting material for diamond synthesis. However, it is also possible to use, as raw materials for diamond formation, amorphous carbon, coal, coke, charcoal, or sugar charcoal containing carbon as its major component, or organic substance containing a number of carbon atoms, such as coal tar, pitch, wood, paper, nathphalene, wax or paraffin. Under the conditions of high reaction temperatures and pressures these organic substances liberate free carbon which is believed to be converted to diamond. In addition to these materials, waste fine diamond powder selected from synthetic diamond can of course be re-used as the raw materials independently or in the form of a mixture with other materials convertible to diamond so as to be grown into a crystal of a larger size.

There is practically no limit on the mixing ratio between the carbonaceous material and the catalyst, and on the physical form thereof. Regardless of the ratio and the form, the formation and growth of diamond crystals occur surely at the interfaces between the material and the catalyst. However, carbonaceous material in mass form tends to form diamond crystals of a larger grain size than the one in powdered form.

Figure 1:
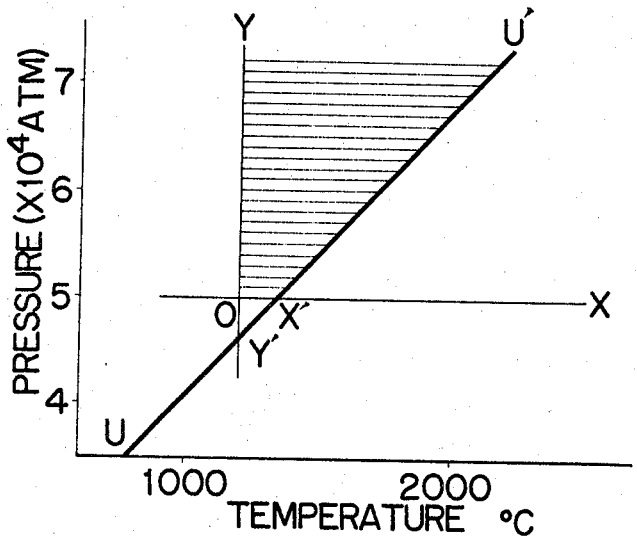
FIG. 1 is a diagram of a diamond-graphite equilibrium line calculated from a theory.

The straight line UU' in FIG. 1 indicates a well known diamond-graphite equilibrium line calculated from the theory given by R. Berman and Sir Francis Simon (Zeitschrift für Electrochemie 59, 333, 1955). The region defined by three crossing straight lines OX, YO and UU', that is U'X'OY, represents the conditions whereby diamond crystals may be obtained in accordance with the method of this invention. The line OX indicates a pressure level of 50,000 atmospheres and the line YO indicates a temperature level of 1200° C. The thermodynamic conditions are independent of the type and form of the catalyst to be employed as well as means of applying pressure and heat.

Although the detailed mechanisms of the occurrence and growth of synthetic diamond during the process according to this invention are not fully understood, it is observed that a catalytic action occurs as soon as one or more elements selected from the group consisting of vanadium, tungsten and molybdenum are mixed with, or brought into contact with, a melted phase involving copper, silver or gold. When only copper, silver, gold or a mixture thereof is brought into contact with raw carbon even at such a high pressure of 94,000 atmospheres and a high temperature of 2300° C., no diamond formation takes place. Similarly, when only vanadium, tungsten, molybdenum or a mixture thereof is put into contact with raw carbon even at such high pressure and temperature as above mentioned, no diamond is obtained with the result that carbides are yielded instead. Especially when a fine powder of carbon and catalyst metals are used the formation of carbides is conspicuous. These facts may tell that none of copper, silver, gold, vanadium, tungsten and molybdenum perform a catalytic action in diamond formation if it is used individually or in combinations within each of the group mentioned above.

According to the present invention, a catalytic action for diamond formation develops only through a cooperative work between the elements selected from the said two groups of elements. It may also be said that the presence of tungsten, vanadium or molybdenum with copper, silver or gold in the synthetic reaction contributes to the development or activation of carbon solvency of copper, silver or gold that is ordinarily nill. On the other hand, tungsten, vanadium or molybdenum, which ordinarily has a strong affinity for carbon and makes a stable carbide thereof, is believed to be considerably weakened of its affinity for carbon in the presence of any one of copper, silver or gold, thus inhibiting the occurrence of carbides thereof and making the liberation of free carbon possible during the synthetic reaction.

Hitherto it has generally been believed that the presence of the catalytic property of each element belongs to its inherent characteristic, so that all of the known catalytic elements as mentioned before are elements which individually perform catalytic actions for diamond formation, and no attention his been paid to developing such catalysts that are formed by a combination of elements each having no catalytic property individually for diamond formation.

As already mentioned, the novel catalysts of this invention are combinations of the elements which have no catalytic property as an individual, but develop a superior catalytic property if used in a suitable combination, which constitutes the principal subject matter of this invention.

The diamond crystals obtained by the method of this invention have a very good appearance and properties. For example, highly transparent and colorless crystals can be easily obtained independently of the strict reaction conditions. As to their grain size, it is possible to secure generally uniform crystals of a grain size of tens of microns when graphite in fine powder form is used as a carbonaceous material, and of a grain size ranging from 0.2 to 0.4 mm. when massive graphite is used. With reference to the structure of the crystals formed in accordance with the method of this invention, while a photograph of X-ray diffraction taken of the synthetic diamonds synthesized by using a nickel catalyst reveals diffraction patterns of so-called satellites which can not be observed in right diamond crystals, no patterns of satellites are observed to be present invention.

Although it is not fully understood why diamond crystals of such high qualities can be produced by the method of this invention, it is believed that the reason responsible for this is due to the fact that diamond crystals to be formed in the existence of the new catalysts of this invention are subject to relatively less chances of their originating in nucleation and to a slacker growth rate than those obtainable in the presence of conventional catalysts such as nickel, iron, cobalt and so on. Further, when nickel or other conventional catalysts are used the nucleation of diamond crystals and the rate of its growth can never be controlled even under a reduced mixing ratio of the catalyst. For example, when nickel catalyst is used, the crystal growth stops usually within one minute of the treatment taking impurities within the crystal and forming undesirable diamond crystals such as dentritic crystals. On the contrary, the crystal growth in the process defined by this invention continues for 5 to 20 minutes of the treatment making it possible that high purity diamond crysals are formed without severe restrictions on temperature and pressure controls.

Figure 2:
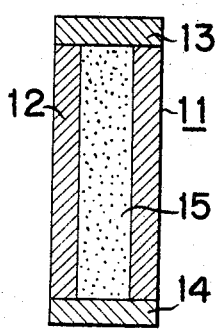
FIG. 2 is an enlarged sectional vertical view of a reaction vessel used in this invention.
Figure 3:
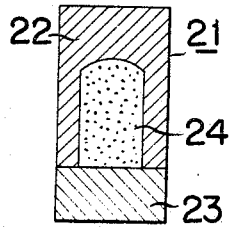
FIG. 3 is an enlarged sectional vertical view of a modified reaction vessel used in this invention.
Figure 4:
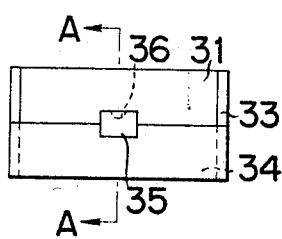
FIG. 4 is an enlarged vertical view of still another reaction vessel used in this invention.
Figure 5:
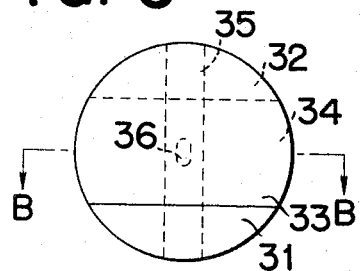
FIG. 5 is an enlarged plan view of the reaction vessel shown in FIG. 4.
Figure 6:
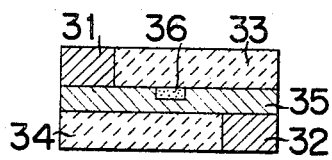
FIG. 6 is a sectional side view taken along the line A—A in FIG. 4.
Figure 7:
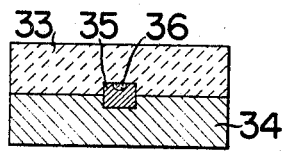
FIG. 7 is a sectional vertical view of the reaction vessel taken along the line B—B in FIG. 5.

For the purpose of carrying out the method of this invention, apparatus of any kind may be employed provided that they are capable of providing enough pressure and temperature. In the examples which follow, an apparatus similar to the one disclosed by H. Tracy Hall, pages 125 to 131, The Review of Scientific Instruments, vol. 31, No. 2 (1960) was employed for reaction vessels as shown in FIGS. 2 and 3. Also as an apparatus for housing the vessel as shown in FIG. 4 for applying high pressures and temperatures, Anbil type apparatus similar to, but larger in size than, the one disclosed by P. W. Bridgman, pages 1 to 17, Proceedings of the Royal Society, vol. 203 A, September 1950 was used.

The following examples are given by way of illustration and are not intended for purposes of limitation.

The metals employed in these examples, such as vanadium, tungsten, molybdenum, their carbides, copper, silver and gold were of a high purity of more than 99.9%, and the raw carbon used in the examples was also of such a high purity as to be used for an electrode in the spectroscopic analysis. The pressure referred to in the examples was calibrated by taking advantage of the pressure-induced phase transition of bismuth (26,000 kg./cm.$^2$ and 90,000 Kg./cm.$^2$), thallium (28,000 Kg./cm.$^2$) and barium (60,000 Kg./cm.$^2$). In measuring the temperature in the examples, a thermocouple was first used and later the temperature was estimated by means of heating wattage. Maximum probable errors in the pressure and the temperature were considered to be ±5,000 atmospheres and ±100° C., respectively. All percentages and parts were by weight.

EXAMPLE 1

A mixture of 3 parts of molybdenum, 2 parts of copper, 2 parts of aluminum and 5 parts of graphite was charged into a reaction vessel 11 (FIG. 2) consisting of a cylindrical graphite tube 12 having an inside diameter of 2 mm., an outside diameter of 4 mm. and a height of 9.5 mm., and disc graphite lids 13 and 14 each having a diameter of 4 mm. and a thickness of one millimeter. The vessel was subjected to a pressure of 50,000 atm. at a temperature of 1260° C. for 20 minutes. The content was then discharged from the vessel and boiled and washed respectively with concentrated sulphuric acid, nitric acid and hydrofluoric acid, with the result that the formation of minute diamond crystals was observed in residue.

EXAMPLE 2

A reaction vessel as described in Example 1 was filled with a mixture of 2 parts of tungsten powder, 2 parts of silver powder, 4 parts of copper powder and one part of graphite powder and allowed to stand for 20 minutes under a pressure of 54,000 atm. at a temperature of 1200° C. After the acid treatments as in Example 1 a number of diamond crystals whose grain size ranged from several tens of microns to 0.2 mm. were formed.

EXAMPLE 3

A mixture of one part of vanadium powder and one part of copper powder was filled into a reaction vessel 21 (FIG. 3) consisting of a columnar graphite tube 22 having an outside diameter of 4 mm. and a height of 6 mm., which had a hollow 24 having a diameter of 2.5 mm. and a depth of 4 mm. and which was sealed at its bottom with a disc lid 23 having a thickness of 2 mm. and a diameter of 4 mm. The vessel was subjected to a pressure of 60,000 atm. at a temperature of 1650° C. for 10 minutes, and thereafter subjected to the acid treatments of Example 1 with the result that a number of colorless and transparent diamond crystals having well-developed (111) faces were obtained.

EXAMPLE 4

A reaction vessel similar to the one used in Example 3 was loaded with 2 parts powdered vanadium carbide and 3 parts powdered silver, and was subjected to a pressure of 65,000 atm. while heated at 1600° C. for 15 minutes. This resulted in a plurality of colorless, transparent diamond crystals having well-developed (111) faces with the grain size of from 0.2 to 0.4 mm.

EXAMPLE 5

A reaction vessel as described in Example 3 was filled with a mixture of 3 parts of molybdenum powder and 2 parts of copper powder and subjected to a pressure of 65,000 atm. during which time it was maintained at 1800° C. for 15 minutes. After this synthesizing reaction, a number of pyramid-shaped diamond crystals were formed having thin metallic films on the surfaces thereof. The diamond crystals obtained were subjected to treatment with the acids of Example 1. The diamond crystals thus refined were colorless and transparent and had well-developed octahedral (111) faces, the grain size thereof being 0.2 to 0.4 mm.

The above procedure was repeated with the exception that a mixture of 3 parts powdered tungsten and one part powdered copper was used as the catalyst. This also resulted in many diamonds of substantially the same nature.

EXAMPLE 6

A reaction vessel similar to the one used in Example 1 was filled with a mixture of one part of molybdenum powder, 2 parts of copper powder, 2 parts of gold powder and one part of graphite powder, and was allowed to stand for 10 minutes under a pressure of 65,000 atm. and at a temperature of 1800° C. After the acid treatments as in Example 1, the diamond crystals obtained were colorless and transparent with grain sizes of from 50 microns to 0.2 mm.

EXAMPLE 7

A reaction vessel similar to the one used in Example 3 was filled with 3 parts of tungsten carbide powder and 2 parts of silver powder, and was subjected to a pressure of 65,000 atm. at a temperature of 1800° C. for 20 minutes. This resulted in the formation of a number of colorless, transparent diamond crystals having well-developed (111) faces and of grain sizes of from 0.2 to 0.4 mm.

EXAMPLE 8

A reaction vessel similar to the one used in Example 1 was alternately filled with a molybdenum plate of 3 mm. in diameter and 0.1 mm. thick, and copper powder. The vessel was allowed to stand for 15 minutes under a pressure of 73,000 atm. at a temperature of 1900° C. As a result a number of colorless and transparent diamond crystals were obtained, the grain size being from 0.2 to 0.4 mm.

EXAMPLE 9

A reaction vessel similar to the one used in Example 1 was filled with one part of molybdenum powder, 2 parts of gold powder and one part of graphite powder, and was allowed to stand for 15 minutes under a pressure of 73,000 atm. at a temperature of 1900° C. As a result a number of colorless, transparent diamond crystals having well-developed (111) faces were obtained, the grain size thereof being from 0.2 to 0.4 mm.

EXAMPLE 10

Several pieces of each of molybdenum and tungsten of a coarse grain size of about 0.3 mm. were mixed with an equal amount of a mixture of one part of fine copper powder and one part of fine silver powder. This whole mixture was charged into a reaction vessel as described in Example 1, and the vessel was allowed to stand for 10 minutes under 73,000 atm. and at a temperature of 1800° C. This resulted in a number of colorless and transparent octahedral diamond crystals of a grain size ranging from 0.2 to 0.4 mm.

EXAMPLE 11

Three different combinations of powdered metals were prepared by mixing one part of a metal selected from the group consisting of aluminum, tin and antimony with a mixture of one part of copper and one part of molybdenum. Each combination was filled into a reaction vessel as described in Example 3 and was allowed to stand for 15 minutes under a pressure of 73,000 atm. and at a temperature of 1800° C. This resulted in a number of colorless and transparent octahedral diamond crystals with respect to each of the combinations, the grain size thereof being 0.2 to 0.4 mm. Substantially the same results were obtained when vanadium powder and tungsten powder were used respectively in lieu of molybdenum.

EXAMPLE 12

Nine different combinations of powdered metals were prepared by mixing one metal selected from the group consisting of vanadium, tungsten and molybdenum with one metal selected from the group consisting of copper, silver and gold, the mixing ratio of all the metals being equal. Each of the combinations prepared was filled into a reaction vessel as shown in FIG. 4 which consisted of two pyrophyllite discs 33 and 34 piled on each other, and a square rod of graphite 35 positioned in a groove cut across the interface between said discs and which had a hollow 36 into which the catalyst was filled, said discs each having a diameter of 6 mm. and a thickness of 1.6 mm. and a portion of each of the discs being supplemented by semi-circular graphite plates 31 and 32.

The vessel containing each of the combinations was allowed to stand for 2 to 15 minutes under pressures of 70,000 to 90,000 atm. and at temperatures of 1800° C. to 2200° C. This resulted in a number of colorless and transparent octahedral diamond crystals of a grain size of 0.2 to 0.5 mm. with respect to each combination.

EXAMPLE 13

Three different combinations of powdered metals were prepared by mixing one part of a metal selected from the the group consisting of carbides of molybdenum, tungsten and vanadium with one part of copper and one part of graphite. Each composition was filled into a reaction vessel as described in Example 1 and was allowed to stand for 10 minutes under a pressure of 73,000 atmospheres and at a temperature of 1800° C. This resulted in a number of colorless and transparent octahedral diamond crystals with respect to each of the combinations, the grain size thereof being 0.2 to 0.4 mm.

X-ray diffraction patterns obtained by photographing the diamond crystals obtained according to the above examples with a two hours' exposure under the conditions of $CuK_\alpha$ radiation, 40 kv. and 20 ma. were those inherent to diamond crystals, and no satellites could be observed at all.

Further, the quantitative analysis of the impurities contained in the diamond crystals obtained according to the method of this invention revealed a content ratio of impurities of only 0.01 to 0.10%.

In comparison, a diffraction photograph, which was taken of diamond crystals obtained by using a nickel and an iron catalyst with a twenty minutes' exposure under the conditions of $CuK_\alpha$ radiation, 35 kv. and 20 ma., showed diffraction patterns of so-called satellites, viz. (111), (200), (220) and (311) corresponding to the lattice constant 3.54 angstroms of nickel, and these satellites were proven to be co-axial with the diamond. Usually, 0.3 to 1.0% of a catalyst metal is contained as an impurity in the synthetic diamond crystals obtained by using a nickel or an iron catalyst.

It will be understood that various changes and modifications may be made, for example, as to particular percentage of the materials to be mixed, without departing from the scope of the invention as defined in the appended claims. It is intended, therefore, that all the matter contained in the foregoing description and in the drawings is to be interpreted as illustrative only and not as limitative of the invention.

What is claimed is:

1. In a method of synthetically making diamonds by subjecting a carbonaceous material to ultra-high pressures and high temperatures for a time sufficient to produce synthetic diamond crystals, the improvement which comprises converting the carbonaceous material to diamond crystals at a pressure of at least about 50,000 atmospheres and a temperature of at least about 1200° C. in the presence of combination of metals which serves as a catalyst, said metals being selected respectively at least from two groups, one consisting of vanadium, tungsten and molybdenum and the other consisting of copper, silver and gold.

2. The method according to claim 1 wherein the time required for the conversion of diamond ranges from 5 to 20 minutes.

3. The method according to claim 1 wherein said combination of metals is in the form of an alloy.

4. The method according to claim 3 wherein the time required for the conversion of diamond ranges from 5 to 20 minutes.

5. The metal according to claim 1 wherein said combination of metals is in the form of a mixture.

6. The method according to claim 5 wherein the time required for diamond conversion ranges from 5 to 20 minutes.

7. The method according to claim 1 wherein said vanadium, tungsten and molybdenum are in the form of carbides.

8. The method according to claim 7 wherein the time required for the conversion ranges from 5 to 20 minutes.

References Cited

UNITED STATES PATENTS

| | | | |
|---|---|---|---|
| 2,947,609 | 8/1960 | Strong | 23—209.1 |
| 2,947,610 | 8/1960 | Hall et al. | 23—209.1 |
| 2,947,611 | 8/1960 | Bundy | 23—209.1 |
| 2,992,900 | 7/1961 | Bouvenkerk | 23—209.1 |

OTHER REFERENCES

Kohn et al.: "American Mineralogist" vol. 47, 1962, pp. 1422–1430.

EDWARD J. MEROS, *Primary Examiner.*